United States Patent [19]

Hart

[11] 4,125,293
[45] Nov. 14, 1978

[54] EMERGENCY PORTION FOR BRAKE CONTROL VALVE

[75] Inventor: James E. Hart, Trafford, Pa.

[73] Assignee: Westinghouse Air Brake Company, Wilmerding, Pa.

[21] Appl. No.: 839,719

[22] Filed: Oct. 5, 1977

[51] Int. Cl.² .............................................. B60T 15/30
[52] U.S. Cl. .......................................... 303/37; 303/69
[58] Field of Search .................................. 303/35–38, 303/69

[56] References Cited

U.S. PATENT DOCUMENTS

| 2,031,213 | 2/1936 | Farmer | 303/35 |
| 4,045,095 | 8/1977 | Temple | 303/37 |

Primary Examiner—Duane A. Reger
Attorney, Agent, or Firm—W. F. Poore; R. W. McIntire, Jr.

[57] ABSTRACT

An upgraded railway freight car brake control valve device comprises a novel emergency valve portion that embodies therein a minimum number of simple and inexpensive poppet valves, one of which is a double seated valve, that replaces yet performs the same functions heretofore performed by more expensive slide type valves which slide valves, and the flat seats upon which they slide as they are shifted from one position to another, in their manufacture require a considerable amount of accurate machining thus increasing the cost of the valve device of which they are an important part.

10 Claims, 3 Drawing Figures

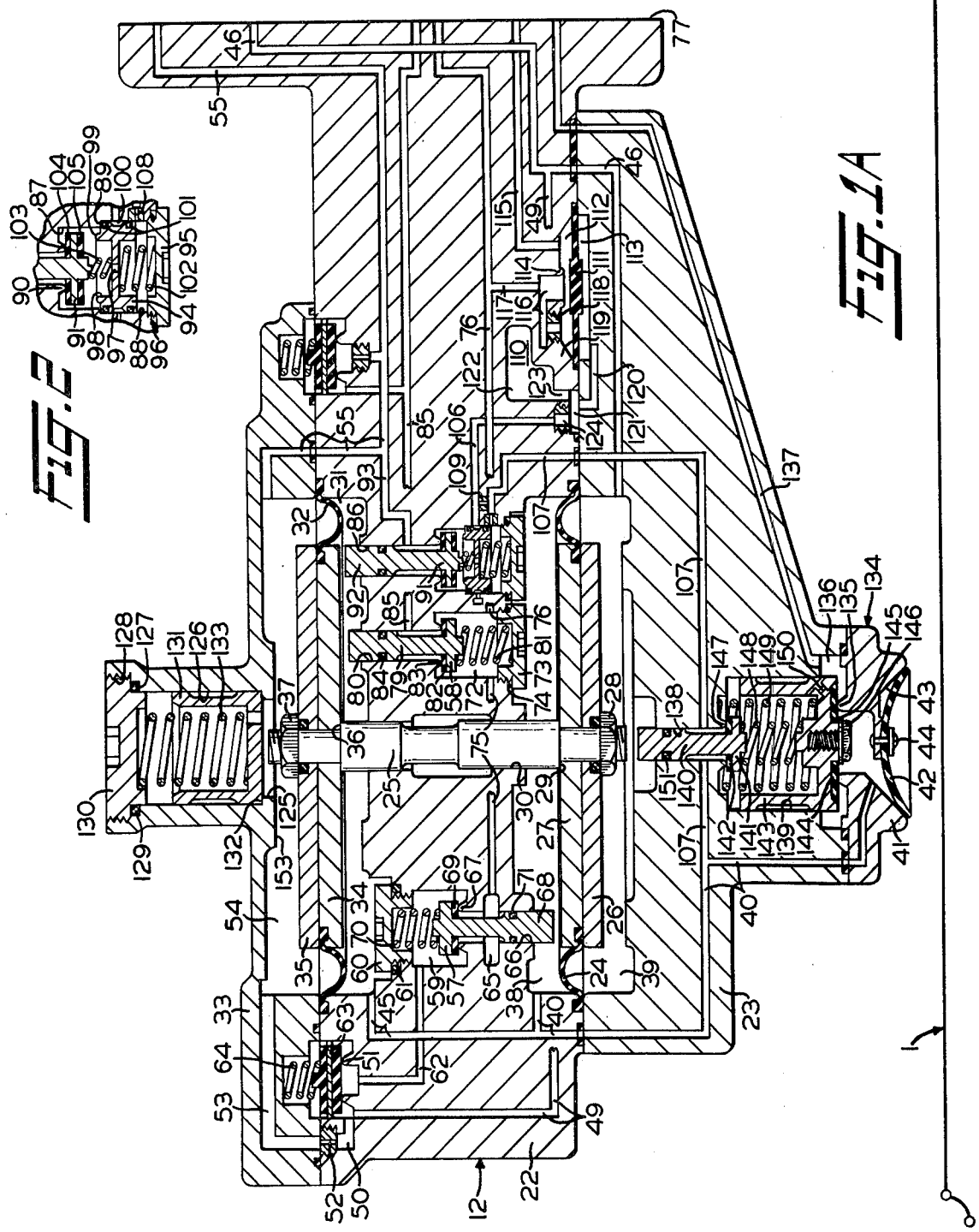

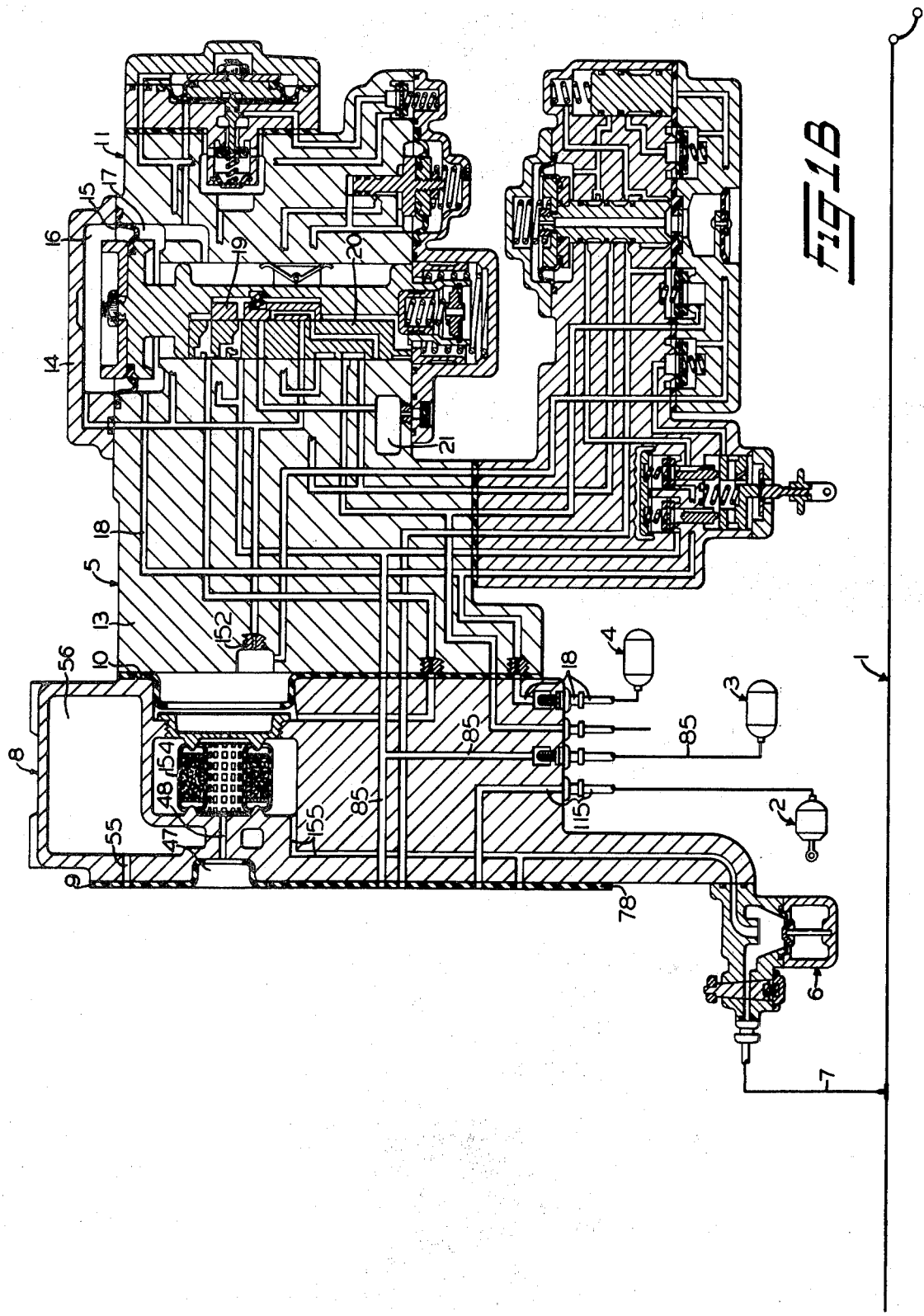

EMERGENCY PORTION FOR BRAKE CONTROL VALVE

BACKGROUND OF THE INVENTION

In U.S. Pat. No. 3,232,678, issued Feb. 1, 1966 to William G. Wilson, and assigned to the assignee of the present application, there is shown and described a brake control valve device that is substantially the same in function and operation as the brake control valve device included in the standard fluid pressure brake apparatus now in use on railway freight cars owned and operated by American railroads.

The brake control valve device shown in the above-mentioned U.S. Pat. No. 3,232,678 comprises a service valve portion embodying therein a plurality of slide, spool and disc type valves, and an emergency valve portion that has a slide-type emergency valve slidable on a flat ported valve seat and a graduating valve slidably mounted on a flat ported surface provided therefor on the side of the emergency slide valve opposite the side thereof that engages the flat ported valve seat. The manufacture and production of these slide-type valves and valve seats require considerable accurate and skillful machining which, as is readily apparent, increases the cost of the emergency valve portion of which they are an essential component.

In U.S. Pat. No. 4,045,095 issued Aug. 30, 1977 to Fred Temple, and assigned to the assignee of the present application, there is shown and described a railway car brake control valve device that is provided with a novel emergency valve portion that embodies therein five simple and inexpensive poppet-type valves that are so disposed between and operated by a pair of spaced-apart and interconnected movable abutments which are subject to atmospheric pressure on their adjacent sides and respectively to brake pipe pressure and quick action chamber pressure on their other side, as to perform the same functions as the emergency valve portion shown in the above-mentioned Wilson patent.

It is apparent that reducing the number of poppet-type valves in an emergency valve portion of a brake control valve device will effect a corresponding reduction in the cost of the emergency valve portion.

Accordingly, it is the general purpose of this invention to provide a railway car brake control valve device with a novel emergency valve portion that embodies therein only four simple and inexpensive poppet-type valves, one of which is a double seated valve, that are so disposed between and operated by a pair of spaced-apart and interconnected abutments, which are subject to atmospheric pressure on their adjacent sides and respectively to brake pipe pressure and quick action chamber pressure on their other side, as to perform the same functions as the emergency valve portion shown in the above-mentioned Temple patent.

SUMMARY OF THE INVENTION

According to the present invention, a railway freight car brake control valve device includes a service valve portion and a pipe bracket that are substantially the same as the service valve portion and pipe bracket shown in the above-mentioned U.S. Pat. No. 3,232,678, and a novel emergency valve portion, which is secured to this pipe bracket, whereby this emergency valve portion, in cooperation with the service valve portion and pipe bracket, constitute an upgraded brake control valve device.

In the accompanying drawings:

FIG. 1A and FIG. 1B, taken together, constitute a diagrammatic view in section of an improved brake control valve device embodying the invention.

DESCRIPTION

As shown in FIGS. 1A and 1B of the drawings, when the right-hand edge of FIG. 1A is placed along side of the left-hand edge of FIG. 1B, an improved freight car fluid pressure brake apparatus embodying the invention comprises a brake pipe 1 that extends from one end of the car to the other, a brake cylinder 2, an emergency or supplemental reservoir 3, an auxiliary reservoir 4, and a brake control valve device 5 connected to the brake pipe 1 through a combined cut-out cock and centrifugal dirt collector 6 and a branch pipe 7.

The brake control valve device 5 may comprise a pipe bracket 8 having gasket faces 9 and 10 disposed opposite each other, a service or triple valve device or portion 11 and a novel emergency valve device or portion 12.

The service valve portion 11 and pipe bracket 8 shown in FIG. 1B of the drawings may be substantially the same in construction and operation as the service valve portion 7 and pipe bracket 6 shown and described in the above-mentioned U.S. Pat. No. 3,232,678. Since reference may be had to this patent for a complete description of the structure and operation of this service valve portion and pipe bracket, it is deemed necessary to describe them in detail herein. Briefly, however, the service valve portion 11 comprises a sectionalized casing 13 between which and a cover member 14, secured thereto by any suitable means (not shown), is the outer periphery of a diagram 15 subject opposingly on its opposite sides to brake pipe pressure in a chamber 16 at the upper side of this diaphragm 15, and to the pressure in the auxiliary reservoir 4 connected to a chamber 17 at the lower side of this diaphragm 15 by a pipe and correspondingly numbered passageway 18 that extends through the pipe bracket 8 and the sectionalized casing 13. Operatively connected to the diaphragm 15 is a service graduating valve 19 and service slide valve 20 for respectively controlling the release of fluid under pressure from the brake pipe 1 to a quick service volume 21 and the supply of fluid under pressure from the auxiliary reservoir 4 to the brake cylinder 2 in response to variations in brake pipe pressure, as disclosed in the above-mentioned U.S. Pat. No. 3,232,678.

The novel emergency portion 12 shown in FIG. 1A of the drawings has a sectionalized casing comprising an upper casing section 22, a lower casing section 23 secured thereto by any suitable means (not shown), and a first annular diaphragm 24 that has its outer periphery clamped between these casing sections 22 and 23.

The inner periphery of the diaphragm 24 is operatively connected to the lower end of a stem 25 that extends through coaxial bores in a pair of diaphragm follower plates 26 and 27 and is provided with screw threads adjacent its lower end for receiving a nut 28 which serves, when tightened, to force the follower plate 27 against a shoulder 29 on the stem 25 and clamp the inner periphery of the diaphragm between the diaphragm follower plates 26 and 27.

As shown in FIG. 1A, the stem 25 extends upward through a bore 30 provided therefor in the casing section 22 and into a chamber 31 formed by the cooperative relationship of the casing section 22 and a second annular diaphragm 32 the outer periphery of which is clamped between the casing section 22 and a cover member 33 secured to this casing section by any suitable means (not shown).

The inner periphery of the diaphragm 32 is operatively connected to the upper end of the stem 25 in that it is clamped between a pair of diaphragm follower plates 34 and 35 that are provided with coaxial bores through which the stem 25 extends. This stem 25 is provided adjacent its upper end with a second shoulder 36 and external screw threads for receiving a nut 37 which serves, when tightened, to force the follower plate 34 against the shoulder 36 and clamp the inner periphery of diaphragm 32 between the plates 34 and 35.

As may be seen from FIG. 1A, the diaphragm 24 and follower plates 26 and 27 cooperate with the casing sections 22 and 23 to form on the respective opposite sides of this diaphragm a pair of chambers 38 and 39.

The chamber 38 is open to atmosphere via a passageway 40 that extends through the casing sections 22 and 23 and a lower cover member 41 secured to the lower end of the casing section 23 by any suitable means (not shown) and past a dished circular shield 42.

The shield 42 is preferably formed of a resilient material, such as rubber, and is held in place, in which its outer periphery rests against a conical inner surface 43 on cover member 41, by any suitable means, such as, for example, a rivet 44 that extends through a bore in cover member 41.

Likewise, the chamber 31 below the diaphragm 32 is open to atmosphere via a passageway 45 that at one end opens into the chamber 31 and at the other into the passageway 40 which is open to atmosphere, as explained above.

As shown in FIG. 1A, opening into the chamber 39 below the diaphragm 24 is one end of a passageway 46 that extends through the casing sections 23 and 22 and at its other end opens into a chamber 47 (FIG. 1B) formed in the pipe bracket 8. Also opening into the chamber 47 is one end of a passageway 48 that is connected to the brake pipe 1 in the manner described in the hereinbefore-mentioned U.S. Pat. No. 3,232,678.

Opening into the passageway 46 intermediate the ends thereof is one end of a passageway 49 that extends through the casing section 22 and at its opposite end opens into a chamber 50 formed between the casing section 22 and cover member 33 which chamber 50, as shown in FIG. 1A, surrounds an annular valve seat 51 and extends to the lower side of a screw-threaded choke 52 carried by this casing section 22.

The choke 52 controls the rate of flow of fluid under pressure from the chamber 50 to a passageway 53 that extends through the cover member 33 and opens into a chamber 54 formed by the cooperative relationship of this cover member 33 with the diaphragm 32 and diaphragm follower plate 35. Also opening into the chamber 54 is one end of a passageway 55 that extends through the cover member 33, casing section 22 and pipe bracket 8 (FIG. 1B) and opens into a quick action chamber 56 formed in this pipe bracket. From the foregoing, it is apparent that the quick action chamber 56 is charged with fluid under pressure from the brake pipe 1 via the choke 52 which in actual practice or, in other words, in heretofore constructed railway freight car brake control valve devices, has a diameter of 0.0200 inch.

As shown in FIG. 1A of the drawings, the casing section 12 embodies therein two identical poppet-type valves 57 and 58.

The poppet-type valve 57 is disposed in a chamber 59 that is formed in the casing section 22 and separated from the atmospheric chamber 31 by a socket head screw-threaded plug 60 that has screw-threaded engagement with screw threads provided therefor in the casing 22. An O-ring seal 61, disposed in a counterbore in the casing section 22 in surrounding relation to the plug 60 and interposed between this casing and plug, prevents leakage of fluid under pressure from the chamber 59 to the chamber 31.

A passageway 62 extending through the casing section 22 opens at one end into the chamber 59 and at the other end within the hereinbefore-mentioned annular valve seat 51 against which a check valve 63 is normally biased by a spring 64 interposed between the upper side of this check valve and the cover member 33 to close communication between the passageway 62 and the chamber 50.

As shown in FIG. 1A, a chamber 65 is provided in the casing section 22 intermediate the chambers 59 and 38 and a bore 66 connects these three chambers, it being noted that an annular valve seat 67 surrounds the upper end of this bore 66.

The poppet valve 57 has formed integral with one side thereof a fluted valve stem 68 that extends through the chamber 65 and the bore 66 into the chamber 38, the portion of this stem extending through the chamber 65 and the upper end of the bore 66 being fluted. A resilient annular member 69 constructed of, for example, rubber, is disposed about the stem 68 and bonded to the lower side of the poppet valve 57, and a spring 70 interposed between the plug 60 and the upper side of this poppet valve 57 is effective to normally bias the annular member 69 against the valve seat 67 to close communication between the chamber 59 and the chamber 65.

Intermediate the fluted portion thereof and its lower end the valve stem 68 is provided with a peripheral annular groove in which is disposed an O-ring seal 71 that forms a seal with the wall surface of the bore 66 to prevent flow of fluid under pressure from the chamber 65 to the chamber 38 which is always open to atmosphere via passageway 40 and past the resilient shield 42.

The poppet-type valve 58 is disposed in a chamber 72 that is formed in the casing section 22 and separated from the atmospheric chamber 38 by a socket head screw-threaded plug 73 and an O-ring seal 74.

A passageway 75 extending through the casing section 22 opens at one end into the chamber 72 and at its other end into the hereinbefore-mentioned chamber 65.

Also, opening at one end into the chamber 72 is one end of a passageway 76 that extends through the casing section 22 to a gasket face 77 formed on the right-hand end of the casing section 22. A ported gasket 78 is disposed between the gasket face 77 on the casing section 22 and the gasket face 9 (FIG. 1A) on the pipe bracket 8. Consequently, one of the ports in this gasket 78 establishes a communication between the passageway 76 in the casing section 22 and a passageway in the pipe bracket 8 that corresponds to the passageway 72 shown in the hereinbefore-mentioned U.S. Pat. No. 3,232,678. As explained in this patent, fluid under pressure is supplied from the auxiliary reservoir 2 (in the patent) to this passageway 72 (in the patent) whenever a service brake application is effected. Accordingly, it is apparent that, likewise, fluid under pressure is supplied from the auxiliary reservoir 4 (FIG. 1B) to the passageway 76 (FIG. 1A) and the chamber 72 by operation of the service portion 11 (FIG. 1B) in response to a reduction of the pressure in the brake pipe 1 at a service rate.

A fluted valve stem 79 of the poppet-type valve 58 is disposed in a bore 80 that extends through the casing 22 from the chamber 72 to the atmospheric chamber 31, and a spring 81 interposed between the plug 73 and this valve 58 is effective to normally bias a resilient annular member 82 of this valve 58 against an annular valve seat 83 to close communication between the chamber 72 and the interior of the bore 80 into which opens intermediate the ends thereof and below an O-ring seal 84 carried on this valve stem 79 one end of a passageway 85. As shown in FIGS. 1A and 1B, this passageway 85 extends through the casing section 22 and pipe bracket 8 and is connected by a correspondingly numbered pipe to the emergency reservoir 3.

The above-described poppet-type valve 57 and 58 in the emergency valve device 12 shown in FIG. 1A of the present application correspond in structure and function to the poppet-type valves 57 and 59 in the above-mentioned U.S. Pat. No. 4,045,095. The two poppet-type valves 58 and 60 shown in FIG. 1A of U.S. Pat. No. 4,045,095, are replaced in the emergency valve device 12 shown in FIG. 1A of the present application by a valve mechanism which will now be described in detail.

As shown in FIG. 1A of the drawings, the casing section 22 is provided with a bore 86, two coaxial counterbores 87 and 88 that form a shoulder 89 therebetween, and an annular valve seat 90 formed at the lower end of the bore 86.

As may be seen from FIG. 1A, a double seated poppet-type valve 91 is disposed in the counterbore 87. A fluted valve stem 92 of this poppet-type valve 91 is slidably disposed in the bore 86 and extends into the chamber 31, opening at the wall surface of the bore 86 intermediate the ends thereof is one end of a passageway 93 that extends through the casing section 22 and opens into the hereinbefore-mentioned passageway 55 that is connected to the quick action chamber 56 (FIG. 1B).

As shown in FIG. 1A, a piston 94 is slidably mounted in the counterbore 88 the lower end of which is closed by a socket head screw-threaded plug 95 and an O-ring seal 96.

Extending through the piston 94 is a bore 97 the upper end of which opens into a coaxial counterbore 98 that has an annular valve seat 99 formed at its upper end.

As shown in FIG. 1A, the piston 94 is provided with an elongated peripheral annular groove 100. Adjacent each end of the elongated groove 100, the piston 94 is provided with a peripheral annular groove in which is disposed an O-ring seal 101 that forms a seal with the wall surface of the counterbore 88.

As further shown in FIG. 1A, a first spring 102 is interposed between the plug 95 and the lower side of the piston 94 and a second spring 103 is interposed between the upper side of this piston 94 and the lower side of the poppet valve 91.

The strength of the spring 102 is greater than that of the spring 103. Moreover, the combined strength of these two springs is such that the spring 102 is effective to normally bias the piston 94 to the position in which it abuts the shoulder 89, and the spring 103 is effective to normally bias a resilient annular member 104 bonded to the upper side of the poppet valve 91 against the valve seat 90. In this position of the valve 91, a resilient annular member 105 bonded to the lower side of this valve 91 is out of seating contact with the valve seat 99.

Also, in this position of the piston 94, the upper O-ring seal 101 carried by this piston 94 forms a seal with the wall surface of the counterbore 88 at a location that is above the location at which one end of a passageway 106 opens at the wall surface of this counterbore 88.

Furthermore, while the piston 94 occupies the position shown in FIG. 1A of the drawings, the lower O-ring seal 101 carried by this piston 94 forms a seal with the wall surface of the counterbore 88 at a location that is below the location at which the one end of the passageway 106 opens at the wall surface of the counterbore 88 and above the location at which one end of a passageway 107 extending through the casing sections 22 and 23 to the passageway 40 opens at the wall surface of this counterbore 88 via a choke 108 carried by the casing section 22. This casing section 22 also carries a choke 109 that provides a restricted communication between the passageways 106 and 107. In actual practice, as in heretofore constructed railway freight car brake control valve devices, the choke 108 has a diameter of 0.081 inch, and the choke 109 has a diameter of 0.0200 inch.

Contained within the casing sections 22 and 23 of the novel emergency portion 12 shown in FIG. 1A is an inshot valve mechanism 110 which is operative, when effecting an emergency application of the brakes, to provide an initial inshot of fluid under pressure to the brake cylinder 2 (FIG. 1B) until a predetermined brake cylinder pressure (about fifteen pounds per square inch) is developed and to then restrict the rate of flow of fluid under pressure to the brake cylinder 2.

The inshot mechanism 110 (FIG. 1A) comprises a flat diaphragm valve 111 the outer periphery of which is clamped between the casing sections 22 and 23 whereby these casing sections cooperate with this diaphragm valve 111 to form on the respective upper and lower sides thereof a pair of chambers 112 and 113.

In the absence of fluid under pressure in the chambers 113 and 112, the diaphragm valve 111 is normally seated on an annular valve seat 114 formed on the casing section 22. The chamber 112 outside the annular valve seat 114 is constantly connected to the brake cylinder 2 (FIG. 1B) by a passageway 115 that extends through the casing section 22 and pipe bracket 8 and a correspondingly numbered pipe.

While the diaphragm valve 111 is seated on the valve seat 114, a chamber 116, which is connected by a short passageway 117 to the hereinbefore-mentioned passageway 76, is open to the chamber 112 outside this valve seat 114 through a screw-threaded choke 118 which is removably mounted in a wall 119 that separates chamber 116 from chamber 112. The choke 118 is readily accessible for removal, replacement and cleaning subsequent to separating the casing sections 22 and 23 and removal of the diaphragm valve 111.

Moreover, in actual practice, as in heretofore constructed railway freight car brake control valve devices, the choke 118 has a diameter of 0.09375 inch.

The chamber 113 below the diaphragm valve 111 is connected by a passageway 120 extending through the casing section 23 to a chamber 121 formed by the cooperative relationship of the casing sections 22 and 23. Formed in the casing section 22 is a volume chamber 122 that is connected to the chamber 121 by a short passageway 123. In actual practice, as in heretofore constructed railway freight car brake control valve devices, the volume chamber 122 has a cubic capacity of fifteen cubic inches.

As shown in FIG. 1A, the other end of the hereinbefore-mentioned passageway 106 opens into the chamber 121 via a choke 124. In actual practice, as in heretofore constructed railway freight car brake control valve devices, the choke 124 has a diameter of 0.1285 inch.

Referring to FIG. 1A, it will be noted that the cover member 33 is provided with a bore 125 that is coaxial with the bore 30 in the casing section 22 and three coaxial counterbores 126, 127 and 128 this latter counterbore 128 being provided with internal screw threads. An O-ring seal 129 is retained in the counterbore 127 by a screw-threaded plug 130 having screw-threaded engagement with the screw-threaded counterbore 128, and a cup-shaped piston 131 slidably mounted in the counterbore 126 is normally biased against a shoulder 132 formed by the lower end of this counterbore 126 by a spring 133 interposed between this piston 131 and the plug 130. This spring 133 and piston 131 yieldingly resists upward deflection of the diaphragms 32 and 24 in a manner hereinafter described.

The emergency valve device 12 shown in FIG. 1A further comprises a brake pipe vent valve device 134 for effecting a rapid release of fluid under pressure from the brake pipe 1 to atmosphere whenever an emergency brake application is effected.

As shown in FIG. 1A, the lower cover member 41 is provided on its upper side with an annular valve seat 135 and cooperates with the casing section 23 to form on the outside of this valve seat 135 an annular chamber 136 into which opens one end of a passageway 137. This passageway 137 extends through the casing sections 23 and 22 to the gasket face 77 on the casing section 22 where it registers with a port in the ported gasket 78. This port in the gasket 78 establishes a communication between the passageway 137 in the casing section 22 and a passageway in the pipe bracket 8 that corresponds to the passageway 37 shown in the hereinbefore-mentioned U.S. Pat. No. 3,232,678. As shown in FIG. 1 of this patent, fluid under pressure is supplied from the brake pipe to this passageway 37 (in the patent). Accordingly, it is apparent that fluid under pressure is supplied from the brake pipe 1 to the passageway 137 (FIG. 1A) and the chamber 136.

Referring to FIG. 1A, it will be noted that the casing section 23 is provided with a bore 138 that at its upper end opens into the hereinbefore-mentioned chamber 39 and at its lower end into a coaxial counterbore 139 the lower end of which opens into the chamber 136.

Slidably mounted in the bore 138 is a fluted valve stem 140 that at its lower end is integral with a poppet-type valve 141 which has a resilient annular valve member 142 bonded thereto in surrounding relation to the valve stem 140, and slidably mounted in the counterbore 139 is a cup-shaped vent valve guide 143. A vent valve 144 constructed of some resilient material, such as, for example, rubber, is clamped to the valve guide 143 by a washer 145 and a cap screw 146. The annular valve member 142 is normally maintained seated on an annular valve seat 147 formed on the casing section 23 at the lower end of the bore 138 by a spring 148 that is interposed between the poppet valve 141 and the vent valve guide 143. This spring 148, together with a spring 149 that is interposed between the casing section 23 and the vent valve guide 143 in surrounding relation to the spring 148, is effective to normally bias the vent valve 144 against the valve seat 135 to close communication between the chamber 136 and atmosphere via the shield 42.

As shown in FIG. 1A, the vent valve guide 143 is provided with a small port or choke 150 through which fluid under pressure may flow at a restricted rate from the chamber 136 to the upper side of the vent valve 144 and vent valve guide 143.

It will be noted from FIG. 1A that the bore 138 intersects the passageway 107 and that the valve stem 140 is provided with a peripheral annular groove in which is disposed an O-ring seal 151 that forms a seal with the wall surface of the bore 138 to prevent leakage of fluid under pressure from the chamber 39 into the passageway 107 which is open to atmosphere via passageway 40 and past the shield 42.

From the foregoing, it is apparent that when the annular valve member 142 is unseated from valve seat 147 in a manner hereinafter explained, fluid under pressure will flow from the upper side of the vent valve 144 and valve guide 143 to atmosphere past the valve seat 147, bore 138, passageways 107 and 40 and past the shield 42 faster than fluid under pressure can flow from the chamber 136 through the choke 150. Consequently, the fluid under pressure in the chamber 136 will unseat the vent valve 144 from its seat 135. With the vent valve 144 thus unseated, fluid under pressure will flow from the brake pipe 1 to atmosphere via branch pipe 7, cut-out cock and dirt collector 6, passageway 137, chamber 136, and thence past valve seat 135 and shield 42 at an emergency rate to cause an emergency brake application in a manner hereinafter described.

OPERATION

Initial Charging

Let it be assumed that a railway freight car provided with the brake control valve device 5 shown in FIGS. 1A and 1B of the drawings has been coupled into a train of cars, and that a handle of an engineer's brake valve device (not shown) located on the locomotive coupled to the head end of the train is in its release position. Consequently, while the handle of the engineer's brake valve device is in its release position, this brake valve device will effect the supply of fluid under pressure to the train brake pipe and, therefore, to the brake pipe 1 to charge the train brake pipe to a preselected normal charged value which, for example, may be seventy pounds per square inch.

Fluid under pressure supplied to the brake pipe 1 will flow via the branch pipe 7 and combined cut-out cock and dirt collector 6 to the brake control valve device 5 to cause the service valve portion 11 of this control valve device 5 to operate in the usual well-known manner of railway freight car brake control valves to effect a release of fluid under pressure from the brake cylinder 2 thereby releasing the brakes on the car and to charge the emergency reservoir 3 and auxiliary reservoir 4 to the pressure carried in the brake pipe 1.

Fluid under pressure supplied to the brake pipe 1 will flow therefrom to, (1) the chamber 136 via the passageway 137, (2) the chamber 39 via the passageway 46, and (3) the chamber 50 via the passageways 46 and 49.

Fluid under pressure thus supplied to the chamber 50 flows therefrom to the chamber 54 above diaphragm 32 via the choke 52 and passageway 53 at a restricted rate determined by the size of the choke 52. Fluid under pressure thus supplied to the chamber 54 flows therefrom to the quick action chamber 56 (FIG. 1B) via the passageway 55 to effect the charging thereof to the normal pressure carried in the brake pipe 1.

It will be noted from FIG. 1A that some of the fluid under pressure supplied to the passageway 55 flows therefrom to the interior of the bore 85 via the passageway 93.

Since the choke 52 restricts the rate of flow of fluid under pressure from the brake pipe 1 to the chamber 54 above the diaphragm 32, the unrestricted flow of fluid under pressure from the brake pipe 1 to the chamber 39 below the diaphragm 24 will cause the pressure to increase in the chamber 39 faster than in the chamber 54 above the diaphragm 32. Consequently, it is apparent that a differential fluid pressure force is established which acts in an upward direction to thereby deflect the diaphragms 24 and 32 upward and shift the diaphragm follower plates 26, 27, 34 and 35, valve stem 25 and piston 131 upward against the yielding resistance of the spring 133.

As the diaphragm follower plate 27 is thus shifted upward, it will first abut the lower end of the stem 68 of the poppet-type valve 57 and thereafter unseat the annular valve member 69 of this valve 57 from its seat 67.

Assuming that no fluid under pressure is present in the brake cylinder 2 (FIG. 1B) at the time the freight car is coupled into the train, there is no flow of fluid under pressure from this brake cylinder 2 to the brake pipe 1 upon unseating of the valve member 69 from the seat 67.

Subsequent to the pressure in the chamber 39 reaching the normal fully charged brake pipe pressure, the continued flow of fluid under pressure to the chamber 54 via the choke 52 will cause the pressure in this chamber 54 to increase to that in the chamber 39.

As the pressure in the chamber 54 is thus increased to that in the chamber 39, the spring 133 is rendered effective to shift the piston 131, stem 25, diaphragm follower plates 26, 27, 34 and 35 and diaphragms 32 and 24 downward until they are returned to the position in which they are shown in FIG. 1A.

As the diaphragm follower plate 27 is thus shifted downward, the spring 70 is rendered effective to seat annular valve member 69 of the poppet valve 57 on its seat 67.

SERVICE APPLICATION

A service application of the brakes is initiated by effecting a gradual reduction in the brake pipe pressure at a service rate in the usual well-known manner. The service portion 11 (FIG. 1B) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with this control valve device 5.

As the pressure in the brake pipe 1 is reduced at a service rate, the pressure in the chamber 39 below the diaphragm 24 will be correspondingly reduced at a service rate.

Since the choke 52 restricts the rate of flow of fluid under pressure from the chambers 54 and 56 to the brake pipe 1, it is apparent that, as the pressure in the chamber 39 below the diaphragm 24 is thus reduced faster than the pressure in the chamber 54 above the diaphragm 32, a differential fluid pressure force is established which acts in a downward direction to deflect diaphragms 32 and 24 downward and thereby effect shifting of stem 25 and diaphragm follower plates 26, 27, 34 and 35 downward.

As the diaphragm follower plate 34 is thus shifted downward, it will first abut the upper end of valve stem 92 of poppet valve 91 and thereafter shift this stem downward to unseat upper annular valve member 104 of this poppet valve 91 from its seat 90 against the yielding resistance of the spring 103 which is less than that of the spring 102.

Since the strength of the spring 102 is greater than that of the spring 103, the piston 94 is maintained against the shoulder 89 at this time.

Moreover, it should be noted that this valve member 104 of the poppet valve 91 is unseated from its seat 90 without the diaphragm follower plate 34 effecting unseating of the valve member 82 of the poppet valve 58 from its seat 83 or the stem 25 effecting unseating of the annular valve member 142 of poppet valve 141 from its seat 147.

Upon the unseating of the annular valve member 104 of the poppet valve 91 from its seat 90, fluid under pressure will flow from the chamber 54 above diaphragm 32 and the quick action chamber 56 to atmosphere via passageways 55 and 93, bore 86, past valve seat 90, counterbore 87, bore 97 in piston 94, counterbore 88, choke 108, passageways 107 and 40, and thence past shield 42 at a rate determined by the size of the choke 108.

As hereinbefore stated, this choke 108 has a diameter of 0.0810 inch which diameter enables fluid under pressure to be released from the chamber 54 above diaphragm 32 and quick action chamber 56 to atmosphere at the same rate as fluid under pressure is being released from the chamber 39 below the diaphragm 24. This enables the pressure differential on the diaphragms 32 and 24 to be substantially destroyed so that these diaphragms are not further deflected in a downward direction.

SERVICE LAP

When the release of fluid under pressure from the brake pipe is terminated, the release of fluid under pressure from the chamber 39 is likewise terminated.

As the flow of fluid under pressure from the chamber 54 and quick action chamber 53 to atmosphere continues, a differential fluid pressure force is established on the diaphragms 24 and 32 which acts in an upward direction. Consequently, these diaphragms 24 and 32 are deflected in an upward direction to shift the stem 25 and diaphragm follower plates 26, 27, 34 and 35 upward.

As the diaphragm follower plate 34 is thus shifted upward from the stem 92 of the poppet valve 91, the spring 103 is rendered effective to seat the annular valve member 104 of this poppet valve 91 on its seat 90 thereby terminating further flow of fluid under pressure from the chamber 54 and quick action chamber 56 to atmosphere.

When the release of fluid under pressure from the brake pipe 1 is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this reduction of pressure in the brake pipe 1, the service valve device 11 will operate to supply fluid under pressure from the auxiliary reservoir 4 (FIG. 1B) to the passageway 76 (FIG. 1A).

Moreover, the emergency valve device 12 operates in the manner explained above to release fluid under pressure from the chamber 54 and quick action chamber 56 to atmosphere via the choke 108. This rate of release of fluid under pressure from the chamber 54 above the diaphragm 32 is less than the emergency rate of release of fluid under pressure from the chamber 39 below the diaphragm 24 via the brake pipe 1.

Therefore, it is apparent that a differential of pressure is quickly established on the diaphragms 32 and 24 which acts in a downward direction to further deflect these diaphragms downward and thereby shift the stem 25 and diaphragm follower plates 26, 27, 34 and 35 downward.

As the stem 25 is thus further shifted in a downward direction, the lower end thereof will first abut the upper end of the stem 140 and thereafter, via this stem 140, effect unseating of the annular valve member 142 of the poppet valve 141 from its seat 147.

Upon this unseating of the annular valve member 142, fluid under pressure will flow from the upper side of the vent valve guide 143 to atmosphere via bore 138, passageways 107 and 40 and past shield 42 faster than fluid under pressure can flow from the chamber 136 through the choke 150. Consequently, the fluid under pressure in the chamber 136 will move the valve guide 143 and vent valve 144 upward from valve seat 135.

When the vent valve 144 is thus unseated from its seat 135, the brake pipe passageway 137 is open to atmosphere via chamber 136, past valve seat 135 and shield 42. With this communication established, fluid under pressure is suddenly vented from the brake pipe 1 at an emergency rate for the purpose of serially transmitting an emergency rate of reduction of pressure in the train brake pipe extending through the train in the usual well-known manner.

As the diaphragm follower plate 34 is thus further shifted downward along with the stem 25, this plate 34, which abuts the upper end of the stem 92 of the poppet valve 91 will abut the upper end of the stem 79 of the poppet valve 58 and thereafter, via this stem 79, unseat the annular valve member 82 from the valve seat 83.

Upon unseating of the annular valve member 82 of the poppet valve 58 from its seat 83, fluid under pressure will flow from the emergency reservoir 3 (FIG. 1B) to the passageway 76 (FIG. 1A) via pipe and passageway 85 (FIGS. 1B and 1A), bore 80 (FIG. 1A), past valve seat 83 and chamber 72.

The fluid under pressure thus supplied to the passageway 76 from the emergency reservoir 4 combines with that supplied to this passageway 76 from the auxiliary reservoir 4 by operation of the service valve device 11 and flows therefrom to the chamber 116 in the inshot mechanism 110 via the passageway 117.

Fluid under pressure thus supplied to the chamber 116 acts on the upper side of the diaphragm valve 111 within the annular valve seat 114 to deflect this diaphragm valve downward so that it is unseated from this valve seat 114 whereupon fluid under pressure will flow from the chamber 116 past this valve seat 114 to the chamber 112 above this diaphragm valve 111.

Moreover, fluid under pressure will flow from the chamber 116 to the chamber 112 via the choke 118. The fluid under pressure thus supplied to the chamber 112 flows therefrom to a pressure chamber (not shown) within the brake cylinder 2 (FIG. 1B) via the passageway and corresponding pipe 115.

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 112 (FIG. 1A). It is apparent that this increasing volume of the pressure chamber within the brake cylinder 2 (FIG. 1B) retards the rate of build up of pressure in this pressure chamber of increasing volume and also in the chamber 112 (FIG. 1A) above the diaphragm valve 111.

Moreover, as the diaphragm follower plate 34 is thus further shifted downward, this plate 34, which abuts the upper end of the stem 92 of the poppet valve 91, will continue to shift this valve 91 and the annular members 104 and 105 carried thereon downward until the annular member 105 carried on the lower side of this valve 91 is moved into seating engagement with the valve seat 99 on the upper side of the piston 94.

Upon the seating of the annular member 105 on the valve seat 99, the flow of fluid under pressure from the quick action chamber 56 (FIG. 1B) and the chamber 54 (FIG. 1A) to atmosphere via the choke 108 and past the shield 42 via the path hereinbefore described is cut off.

Since fluid under pressure is now being released from the brake pipe 1 at an emergency rate, the pressure in the chamber 39 below the diaphragm 24 will continue to be reduced until the pressure in this chamber 39 is atmospheric pressure.

As the pressure in the chamber 39 is thus reduced to atmospheric pressure, the trapped pressure in the chamber 54 is rendered effective to further deflect the diaphragms 32 and 24, diaphragm follower plates 26, 27, 34 and 35 and stem 25 in a downward direction.

It is apparent from FIG. 1A that as the diaphragm follower plate 34 is thus further shifted in a downward direction, the stem 92, valve 91, annular members 104 and 105 on the opposite sides of this valve 91 and the piston 94 are now shifted in a downward direction against the yielding resistance of the spring 102, it being noted that the spring 103 is not further compressed subsequent to the annular member 104 on the lower side of the valve 91 engaging the valve seat 99 on the upper side of the piston 94.

From the foregoing, it is apparent that the stem 92, valve 91, annular members 104 and 105 carried by valve 91 and the piston 94 will now be shifted downward by the diaphragm follower plate 34 until the lower side of this piston 94 abuts the upper end of the plug 95.

While the lower side of the piston 94 abuts the upper end of the plug 95, the upper O-ring seal 101 carried on the piston 94 forms a seal with the wall surface of the counterbore 88 at a location that is below the location at which the end of the passageway 106 opens at this wall surface of the counterbore 88 and above the location at which the choke 108 opens at this wall surface.

Moreover, the lower O-ring seal 101 carried on the piston 94 forms a seal with the wall surface of the coundetermined by the size of the choke 52. Fluid under pressure thus supplied to the chamber 54 flows therefrom to the quick action chamber 56 (FIG. 1B) via the passageway 55 to effect the charging thereof to the normal pressure carried in the brake pipe 1.

It will be noted from FIG. 1A that some of the fluid under pressure supplied to the passageway 55 flows therefrom to the interior of the bore 85 via the passageway 93.

Since the choke 52 restricts the rate of flow of fluid under pressure from the brake pipe 1 to the chamber 54 above the diaphragm 32, the unrestricted flow of fluid under pressure from the brake pipe 1 to the chamber 39 below the diaphragm 24 will cause the pressure to increase in the chamber 39 faster than in the chamber 54 above the diaphragm 32. Consequently, it is apparent that a differential fluid pressure force is established which acts in an upward direction to thereby deflect the diaphragms 24 and 32 upward and shift the diaphragm follower plates 26, 27, 34 and 35, valve stem 25 and piston 131 upward against the yielding resistance of the spring 133.

As the diaphragm follower plate 27 is thus shifted upward, it will first abut the lower end of the stem 68 of the poppet-type valve 57 and thereafter unseat the annular valve member 69 of this valve 57 from its seat 67.

Assuming that no fluid under pressure is present in the brake cylinder 2 (FIG. 1B) at the time the freight car is coupled into the train, there is no flow of fluid under pressure from this brake cylinder 2 to the brake pipe 1 upon unseating of the valve member 69 from the seat 67.

Subsequent to the pressure in the chamber 39 reaching the normal fully charged brake pipe pressure, the continued flow of fluid under pressure to the chamber 54 via the choke 52 will cause the pressure in this chamber 54 to increase to that in the chamber 39.

As the pressure in the chamber 54 is thus increased to that in the chamber 39, the spring 133 is rendered effective to shift the piston 131, stem 25, diaphragm follower plates 26, 27, 34 and 35 and diaphragms 32 and 24 downward until they are returned to the position in which they are shown in FIG. 1A.

As the diaphragm follower plate 27 is thus shifted downward, the spring 70 is rendered effective to seat annular valve member 69 of the poppet valve 57 on its seat 67.

SERVICE APPLICATION

A service application of the brakes is initiated by effecting a gradual reduction in the brake pipe pressure at a service rate in the usual well-known manner. The service portion 11 (FIG. 1B) of the brake control valve device 5 will operate in the usual manner of the service portion of heretofore known railway freight car brake control valve devices to effect the supply of fluid under pressure from the auxiliary reservoir 4 to the brake cylinder 2 to cause a service brake application on the freight car provided with this control valve device 5.

As the pressure in the brake pipe 1 is reduced at a service rate, the pressure in the chamber 39 below the diaphragm 24 will be correspondingly reduced at a service rate.

Since the choke 52 restricts the rate of flow of fluid under pressure from the chambers 54 and 56 to the brake pipe 1, it is apparent that, as the pressure in the chamber 39 below the diaphragm 24 is thus reduced faster than the pressure in the chamber 54 above the diaphragm 32, a differential fluid pressure force is established which acts in a downward direction to deflect diaphragms 32 and 24 downward and thereby effect shifting of stem 25 and diaphragm follower plates 26, 27, 34 and 35 downward.

As the diaphragm follower plate 34 is thus shifted downward, it will first abut the upper end of valve stem 92 of poppet valve 91 and thereafter shift this stem downward to unseat upper annular valve member 104 of this poppet valve 91 from its seat 90 against the yielding resistance of the spring 103 which is less than that of the spring 102.

Since the strength of the spring 102 is greater than that of the spring 103, the piston 94 is maintained against the shoulder 89 at this time.

Moreover, it should be noted that this valve member 104 of the poppet valve 91 is unseated from its seat 90 without the diaphragm follower plate 34 effecting unseating of the valve member 82 of the poppet valve 58 from its seat 83 or the stem 25 effecting unseating of the annular valve member 142 of poppet valve 141 from its seat 147.

Upon the unseating of the annular valve member 104 of the poppet valve 91 from its seat 90, fluid under pressure will flow from the chamber 54 above diaphragm 32 and the quick action chamber 56 to atmosphere via passageways 55 and 93, bore 86, past valve seat 90, counterbore 87, bore 97 in piston 94, counterbore 88, choke 108, passageways 107 and 40, and thence past shield 42 at a rate determined by the size of the choke 108.

As hereinbefore stated, this choke 108 has a diameter of 0.0810 inch which diameter enables fluid under pressure to be released from the chamber 54 above diaphragm 32 and quick action chamber 56 to atmosphere at the same rate as fluid under pressure is being released from the chamber 39 below the diaphragm 24. This enables the pressure differential on the diaphragms 32 and 24 to be substantially destroyed so that these diaphragms are not further deflected in a downward direction.

SERVICE LAP

When the release of fluid under pressure from the brake pipe is terminated, the release of fluid under pressure from the chamber 39 is likewise terminated.

As the flow of fluid under pressure from the chamber 54 and quick action chamber 53 to atmosphere continues, a differential fluid pressure force is established on the diaphragms 24 and 32 which acts in an upward direction. Consequently, these diaphragms 24 and 32 are deflected in an upward direction to shift the stem 25 and diaphragm follower plates 26, 27, 34 and 35 upward.

As the diaphragm follower plate 34 is thus shifted upward from the stem 92 of the poppet valve 91, the spring 103 is rendered effective to seat the annular valve member 104 of this poppet valve 91 on its seat 90 thereby terminating further flow of fluid under pressure from the chamber 54 and quick action chamber 56 to atmosphere.

When the release of fluid under pressure from the brake pipe 1 is terminated, the service valve device 11 will move to a lap position to cut off flow of fluid under pressure from the auxiliary reservoir 4 to the brake cylinder 2.

EMERGENCY APPLICATION

To effect an emergency application of the brakes, fluid under pressure is suddenly vented at a rapid rate from the brake pipe 1. Upon this reduction of pressure in the brake pipe 1, the service valve device 11 will operate to supply fluid under pressure from the auxiliary reservoir 4 (FIG. 1B) to the passageway 76 (FIG. 1A).

Moreover, the emergency valve device 12 operates in the manner explained above to release fluid under pressure from the chamber 54 and quick action chamber 56 to atmosphere via the choke 108. This rate of release of fluid under pressure from the chamber 54 above the diaphragm 32 is less than the emergency rate of release of fluid under pressure from the chamber 39 below the diaphragm 24 via the brake pipe 1.

Therefore, it is apparent that a differential of pressure is quickly established on the diaphragms 32 and 24 which acts in a downward direction to further deflect these diaphragms downward and thereby shift the stem 25 and diaphragm follower plates 26, 27, 34 and 35 downward.

As the stem 25 is thus further shifted in a downward direction, the lower end thereof will first abut the upper end of the stem 140 and thereafter, via this stem 140, effect unseating of the annular valve member 142 of the poppet valve 141 from its seat 147.

Upon this unseating of the annular valve member 142, fluid under pressure will flow from the upper side of the vent valve guide 143 to atmosphere via bore 138, passageways 107 and 40 and past shield 42 faster than fluid under pressure can flow from the chamber 136 through the choke 150. Consequently, the fluid under pressure in the chamber 136 will move the valve guide 143 and vent valve 144 upward from valve seat 135.

When the vent valve 144 is thus unseated from its seat 135, the brake pipe passageway 137 is open to atmosphere via chamber 136, past valve seat 135 and shield 42. With this communication established, fluid under pressure is suddenly vented from the brake pipe 1 at an emergency rate for the purpose of serially transmitting an emergency rate of reduction of pressure in the train brake pipe extending through the train in the usual well-known manner.

As the diaphragm follower plate 34 is thus further shifted downward along with the stem 25, this plate 34, which abuts the upper end of the stem 92 of the poppet valve 91 will abut the upper end of the stem 79 of the poppet valve 58 and thereafter, via this stem 79, unseat the annular valve member 82 from the valve seat 83.

Upon unseating of the annular valve member 82 of the poppet valve 58 from its seat 83, fluid under pressure will flow from the emergency reservoir 3 (FIG. 1B) to the passageway 76 (FIG. 1A) via pipe and passageway 85 (FIGS. 1B and 1A), bore 80 (FIG. 1A), past valve seat 83 and chamber 72.

The fluid under pressure thus supplied to the passageway 76 from the emergency reservoir 4 combines with that supplied to this passageway 76 from the auxiliary reservoir 4 by operation of the service valve device 11 and flows therefrom to the chamber 116 in the inshot mechanism 110 via the passageway 117.

Fluid under pressure thus supplied to the chamber 116 acts on the upper side of the diaphragm valve 111 within the annular valve seat 114 to deflect this diaphragm valve downward so that it is unseated from this valve seat 114 whereupon fluid under pressure will flow from the chamber 116 past this valve seat 114 to the chamber 112 above this diaphragm valve 111.

Moreover, fluid under pressure will flow from the chamber 116 to the chamber 112 via the choke 118. The fluid under pressure thus supplied to the chamber 112 flows therefrom to a pressure chamber (not shown) within the brake cylinder 2 (FIG. 1B) via the passageway and corresponding pipe 115.

The fluid under pressure thus supplied to the pressure chamber within cylinder 2 will act on one side of the piston (not shown) therein and move this piston outward against the yielding resistance of the brake cylinder release spring (not shown) that acts on the other side of this piston. As this piston is thus moved, it increases the volume of the pressure chamber to which fluid under pressure is being supplied from the chamber 112 (FIG. 1A). It is apparent that this increasing volume of the pressure chamber within the brake cylinder 2 (FIG. 1B) retards the rate of build up of pressure in this pressure chamber of increasing volume and also in the chamber 112 (FIG. 1A) above the diaphragm valve 111.

Moreover, as the diaphragm follower plate 34 is thus further shifted downward, this plate 34, which abuts the upper end of the stem 92 of the poppet valve 91, will continue to shift this valve 91 and the annular members 104 and 105 carried thereon downward until the annular member 105 carried on the lower side of this valve 91 is moved into seating engagement with the valve seat 99 on the upper side of the piston 94.

Upon the seating of the annular member 105 on the valve seat 99, the flow of fluid under pressure from the quick action chamber 56 (FIG. 1B) and the chamber 54 (FIG. 1A) to atmosphere via the choke 108 and past the shield 42 via the path hereinbefore described is cut off.

Since fluid under pressure is now being released from the brake pipe 1 at an emergency rate, the pressure in the chamber 39 below the diaphragm 24 will continue to be reduced until the pressure in this chamber 39 is atmospheric pressure.

As the pressure in the chamber 39 is thus reduced to atmospheric pressure, the trapped pressure in the chamber 54 is rendered effective to further deflect the diaphragms 32 and 24, diaphragm follower plates 26, 27, 34 and 35 and stem 25 in a downward direction.

It is apparent from FIG. 1A that as the diaphragm follower plate 34 is thus further shifted in a downward direction, the stem 92, valve 91, annular members 104 and 105 on the opposite sides of this valve 91 and the piston 94 are now shifted in a downward direction against the yielding resistance of the spring 102, it being noted that the spring 103 is not further compressed subsequent to the annular member 104 on the lower side of the valve 91 engaging the valve seat 99 on the upper side of the piston 94.

From the foregoing, it is apparent that the stem 92, valve 91, annular members 104 and 105 carried by valve 91 and the piston 94 will now be shifted downward by the diaphragm follower plate 34 until the lower side of this piston 94 abuts the upper end of the plug 95.

While the lower side of the piston 94 abuts the upper end of the plug 95, the upper O-ring seal 101 carried on the piston 94 forms a seal with the wall surface of the counterbore 88 at a location that is below the location at which the end of the passageway 106 opens at this wall surface of the counterbore 88 and above the location at which the choke 108 opens at this wall surface.

Moreover, the lower O-ring seal 101 carried on the piston 94 forms a seal with the wall surface of the counterbore 88 at a location that is below the location at which the choke 108 opens at this wall surface.

Therefore, upon movement of the piston 94 to the position in which its lower side abuts the upper end of the plug 95, fluid under pressure will flow from the quick action chamber 56 (FIG. 1B) and chamber 54 (FIG. 1A) to atmosphere via passageways 55 and 93, bore 86, past valve seat 90, counterbore 87, passageway 106, choke 109, passageways 107 and 40, and past the shield 42.

Since the choke 109 restricts the flow of fluid under pressure from the passageway 106 to the passageway 107, some of the fluid under pressure supplied to the passageway 106 upstream of this choke 109 will flow to the chamber 113 below the diaphragm valve 111 via this passageway 106, choke 124, chamber 121 and passageway 120 at a rate determined by the size of the choke 124.

It may be seen from FIG. 1A that some of the fluid under pressure supplied to the chamber 121 flows therefrom to the volume chamber 122 via the passageway 123. The volume of this chamber 123, which, as aforestated, is fifteen cubic inches, and the diameter of the chokes 109 and 124 which, as aforestated, are respectively 0.0200 inch and 0.1285 inch, are such that when the pressure in the pressure chamber within the brake cylinder 2 (FIG. 1B) has increased to fifteen pounds per square inch, the pressure in the chamber 113 (FIG. 1A) below the diaphragm valve 111 will be of sufficient value to deflect this diaphragm valve 111 in an upward direction until it seats on the annular valve seat 114 thereby closing off the rapid flow of fluid under pressure to the brake cylinder 2 by way of the annular valve seat 114. With the diaphragm valve 111 thus seated on valve seat 114, fluid under pressure continues to flow from the chamber 116 to the brake cylinder 2 (FIG. 1B) via the choke 118 (FIB. 1A), chamber 112 and passageway and pipe 115 (FIG. 1B), the choke 118 forming a by-pass communication around the diaphragm valve 111 which is now seated on the valve seat 114. The choke 118 provides for the second stage of increase in brake cylinder pressure at a slower rate. The pressure in the brake cylinder 2 will now continue to build up at this slower rate determined by the size of the choke 118 until equalization of the pressure in the auxiliary reservoir 4, emergency reservoir 3 and brake cylinder 2 occurs.

From the foregoing, it is apparent that the emergency valve device 12 of the brake control valve device 5 provides a two-stage buildup of pressure in the brake cylinder 2.

Referring now to FIG. 1A, it will be seen that the fluid under pressure in the volume reservoir 122 and the chamber 113 below the diaphragm valve 111 can flow to atmosphere via passageways 123 and 120, chamber 121, choke 124, passageway 106, choke 109, passageway 107, bore 138, passageway 40 and past shield 42 at a rate determined by the size of the chokes 124 and 109. As hereinbefore stated, the volume reservoir 132 has a capacity of fifteen cubic inches, and the diameters of the chokes 124 and 109 are 0.1285 inch and 0.0200 inch respectively. With the reservoir 122 thus having a volume of fifteen cubic inches and the chokes 124 and 109 having a diameter of 0.1285 inch and 0.0200 inch respectively, the pressure in the volume reservoir 122 and the chamber 113 below the diaphragm valve 111 will be reduced to atmospheric pressure at substantially the same time that equalization of the pressures in the auxiliary reservoir 4, emergency reservoir 3 and the brake cylinder 2 occurs. Therefore, there is no further increase in brake cylinder pressure subsequent to the pressure in the chamber 113 being reduced to atmospheric pressure.

Since fluid under pressure is supplied from both the auxiliary reservoir 4 and the emergency reservoir 3 to the brake cylinder 2 when an emergency brake application is effected, it is apparent that a higher pressure is obtained in the brake cylinder 2 than is the case when a service brake application is effected.

When all fluid under pressure is released from the quick action chamber 56 and the brake pipe 1 and, therefore from the chambers 54 and 39, the valve stem 25, diaphragms 32 and 24 and diaphragm follower plates 26, 27, 34 and 35 will return to the position shown in FIG. 1A.

RELEASE OF THE BRAKES AFTER AN EMERGENCY APPLICATION

To effect a release of the brakes after an emergency application, fluid under pressure is supplied to the brake pipe 1 from whence it flows to the chamber 39 (FIG. 1A) below the diaphragm 24 in the emergency valve device 12 and the chamber 50 below the choke 52 in this valve device 12.

Moreover, fluid under pressure flows from the brake pipe 1 to the chamber 16 (FIG. 1B) above the diaphragm 15 in the service valve device 11 at a restricted rate determined by the size of a choke 152.

It will be noted from FIGS. 1A and 1B of the drawings that fluid under pressure flows at an unrestricted rate to the chambers 39 and 50 in the emergency valve device 12 since there are no chokes in the passageways 46 and 49.

Furthermore, it will be noted from FIG. 1A that the choke 52 restricts the rate of flow of fluid under pressure from the chamber 50 to the chamber 54 above the diaphragm 32 and the quick action chamber 56 via passageways 53 and 55. Accordingly, it is apparent that the pressure in the chamber 39 below the diaphragm 24 will increase more rapidly than will the pressure in the chamber 54 above the diaphragm 32.

Furthermore, it is apparent that the more rapid rate of increase of pressure in the chamber 39 quickly establishes a fluid pressure differential force which is effective to deflect the diaphragms 24 and 32 in an upward direction, as viewed in FIG. 1A.

Moreover, it is apparent that this upward deflection of the diaphragms 24 and 32 is effective to shift the valve stem 25, diaphragm follower plates 26, 27, 34 and 35, and piston 131 in an upward direction against the yielding resistance of the spring 133 until the diaphragm follower plate 35 abuts a stop surface 153 on the lower side of cover member 33.

As the diaphragm follower plate 34 is thus shifted upward, it is moved away from the upper end of the stem 92 of the poppet valve 91 and away from the upper end of the stem 79 of the poppet valve 58.

As the diaphragm follower plate 34 is thus shifted upward and away from the stem 92 of the poppet valve 91, the spring 102 is rendered effective to shift piston 94, spring 103, poppet valve 91, annular members 104 and 105 carried by this valve 91, and the stem 92 of this valve 91 upward until the piston 94 is returned to the position shown in FIG. 1A in which position it abuts the shoulder 89 at the upper end of the counterbore 88.

As the diaphragm follower plate 34 continues to be shifted upward, subsequent to movement of the piston 94 into abutting relationship with the shoulder 89, the spring 103 is rendered effective to first unseat the annular member 105 carried on the lower size of the valve 91 from the valve seat 99 on the upper end of the piston 94 and thereafter shift the valve 91 and annular members 104 and 105 carried thereon upward until the annular member 104 is seated on the valve seat 90.

Upon the seating of the annular member 104 carried on the upper side of the valve 91 on the valve seat 90, communication between the chambers 54 and 56 and atmosphere is closed.

It will be noted that, upon the return of the piston 94 to the position in which it is shown in FIG. 1A, the fluid under pressure present in the chamber 113 below the diaphragm valve 111 will flow to atmosphere via passageway 120, chamber 121, choke 124, passageway 106, choke 109, passageways 107 and 40, and past shield 42 until the pressure in this chamber 113 is reduced to atmospheric pressure.

Moreover, as the diaphragm follower plate 34 is moved upward from the upper end of the stem 79 of the poppet valve 58, spring 81 is rendered effective to seat annular valve member 82 of poppet valve 58 on its seat 83 to close communication between the emergency reservoir 3 and the brake cylinder 2.

Likewise, as the valve stem 25 is shifted upward, the spring 148 is rendered effective to seat annular valve member 142 of poppet valve 141 on its seat 147 thereby closing communication between the interior of counterbore 139 and atmosphere.

Subsequent to the seating of annular valve member 142 on its seat 147, fluid under pressure supplied from the brake pipe 1 to the chamber 136 via branch pipe 7, cut-out cock and dirt collector 6, and passageway 137, and thence via the choke 150 to the upper side of the vent valve guide 143, will be retained within counterbore 139. Upon equalization of the pressures in chamber 136 and on the upper side of the vent valve guide 143, the spring 149 is rendered effective to seat brake pipe vent valve 144 on its seat 135 thereby cutting off flow of fluid under pressure from the chamber 136 and the brake pipe 1 to atmosphere past the shield 42.

As the diaphragm follower plate 27 is moved upward by the upward deflection of the diaphragms 24 and 32, subsequent to the seating of the annular valve members 104 and 82 of the poppet valves 91 and 58 on their respective valve seats 90 and 83 in the manner described above, this follower plate 27 will first abut the lower end of the valve stem 68 of the poppet valve 57 and thereafter lift the annular valve member 69 of this valve 57 from its seat 67 against the yielding resistance of the spring 70.

Since the pressure in the chamber 113 has been reduced to atmospheric pressure, as hereinbefore explained, brake cylinder pressure present in chamber 112, which is connected to the brake cylinder 2 (FIG. 1B) by the passageway and pipe 115, will now deflect diaphragm valve 111 (FIG. 1B) downward away from the valve seat 114 whereupon fluid under pressure will flow from the brake cylinder 2 (FIG. 1B), and the auxiliary reservoir 4 connected thereto via the service valve device 11 which is still in its service application position to the brake pipe 1 via pipe and passageway 115, chamber 112 (FIG. 1A), past valve seat 114 and through choke 118, chamber 116, passageways 117 and 76, chamber 72, passageway 75, chamber 65, bore 66, past valve seat 67, chamber 59, passageway 62, past valve seat 51, check valve 63 being unseated against the yielding resistance of the spring 64, chamber 50, passageway 49, passageway 46, chamber 47 (FIG. 1B), passageway 48, a strainer device 154 and a passageway 155 in the pipe bracket 8, combined cut-out cock and dirt collector 6 and branch pipe 7.

The above-mentioned flow of fluid under pressure from the brake cylinder 2 and auxiliary reservoir 4 to the brake pipe 1 accelerates the rate of recharge of the brake pipe. This action naturally occurs first at the head end of the train when the increase in brake pipe pressure is first effected, and the sudden increase in brake pipe pressure on one car causes the emergency valve device on the next car to function in the same manner, so that this back dump operation is rapidly transmitted serially from car to car throughout the length of the train.

It will be noted from FIG. 1A that some of the fluid under pressure supplied from the brake cylinder 2 and auxiliary reservoir 4 to the chamber 50, in the manner described above, flows from this chamber 50 to the chamber 54 above the diaphragm 32 via the choke 52 and passageway 53.

Moreover, fluid under pressure thus supplied to the chamber 54 flows therefrom to the quick action chamber 56 via the passageway 55.

From the foregoing, it is apparent that fluid under pressure will flow from the brake cylinder 2 and auxiliary reservoir 4 to the brake pipe 1 until substantial equalization of pressures therebetween occurs, and also that fluid under pressure will flow through the choke 52 until the pressure in the chamber 54 and quick action chamber 56 is substantially the same as the pressure in the chamber 39 and the brake pipe 1.

As the pressure in the chamber 54 above the diaphragm 32 is increased by flow of fluid under pressure to this chamber through the choke 52, the differential fluid pressure force acting upward on the diaphragms 24 and 32 is correspondingly reduced. Therefore, as this differential fluid pressure force is thus reduced, the spring 133 is rendered effective via the piston 131 to shift the valve stem 25 and diaphragm follower plates 26, 27, 34 and 35 downward until the piston 131 abuts the shoulder 132.

Upon equalization of pressure in chambers 54 and 39, the inherent resilience of the diaphragms 32 and 24 return these diaphragms, the stem 25 and the diaphragm follower plates 26, 27, 34 and 35 to the position in which they are shown in FIG. 1A.

As the diaphragm follower plate 27 is thus moved downward to the position in which it is shown in FIG. 1A, the spring 70 is rendered effective to seat annular valve member 69 of the poppet-type valve 57 on its seat 67 thereby closing communication between the brake cylinder 2 (FIG. 1B) and the brake pipe 1 and thus preventing further flow of fluid under pressure from the brake cylinder 2 to the brake pipe 1.

As fluid under pressure is supplied to the chamber 16 (FIG. 1B) in the manner described above, the resulting increase in pressure in this chamber 16 will deflect the diaphragm 15 downward to thereby return the graduating valve 19 and the service valve 20 of the service valve device 11 to the position shown. The fluid under pressure now remaining in the brake cylinder 2 will flow to atmosphere via pipe and passageway 115, chamber 112, past valve seat 114, choke 118 in parallel therewith, chamber 116, passageways 117 and 76, and passageways and ports in the service valve device 11 it being understood that these passageways and ports correspond to ports and passageways in the service valve device 7 of the brake control valve device 1 shown in hereinbefore-mentioned U.S. Pat. No. 3,232,678 through which fluid under pressure may flow from the brake cylinder 7 shown in this patent to atmosphere.

With the release of all fluid under pressure from the brake cylinder 2 (FIG. 1A), the brakes on the car will be completely released.

Furthermore, the emergency reservoir 3 and the auxiliary reservoir 4 will now be charged from the brake pipe 1 to the normal fully charged train brake pipe pressure.

Having now described the invention, what I claim as new and desire to secure by Letters Patent, is:

1. For use in a brake apparatus including a brake pipe, an auxiliary reservoir and an emergency reservoir each normally charged to a certain chosen pressure, a brake cylinder and a fluid-pressure-operated service valve device, a fluid-pressure-operated emergency valve device operative in conjunction with said service valve device in response to a reduction of the pressure in the brake pipe at an emergency rate to effect the supply of fluid under pressure from said reservoirs to said brake cylinder to cause an emergency brake application, said emergency valve device comprising:

(a) a casing having therein a plurality of chambers, bores and passageways, one of said bores having coaxial therewith a pair of counterbores of unequal diameter whereby a shoulder is formed therebetween, said one bore and a first one of said plurality of passageways cooperating to provide a communication through which fluid under pressure may be released from another chamber other than said plurality of chambers to atmosphere via said pair of coaxial counterbores, said one bore having at one end an annular valve seat, and one end of said passageways opening into said chambers and bores and the other end being connected respectively to the brake pipe, the emergency reservoir and said another chamber, (b) a plurality of poppet-type valves, each having a fluted stem, for controlling flow between said chambers and passageways, one of said poppet-type valves being a double seated valve having a pair of spaced-apart annular members carried thereon, one of which cooperates with said annular valve seat at said one end of said one bore to control flow between said another chamber and said coaxial counterbores at the wall surface of which larger counterbore opens, one above the other, one end of two other of said passageways, the other end of the lower one of said two other passageways being open to atmosphere, (c) an annular piston having on one side thereof an annular valve seat and carrying thereon a pair of spaced-apart seals for sealing engagement with the wall surface of said larger counterbore in which said annular piston is slidably mounted, (d) a pair of springs of unequal strength, the ligher of which is interposed between said one side of said piston and said one double seated poppet-type valve for normally biasing said one annular member carried on said one valve into seating engagement with said annular valve seat at said one end of said one bore, and the heavier of which is interposed between the other side of said piston and said casing to normally bias said piston against said shoulder, (e) a pair of chokes of unequal diameter, the larger of which is so disposed as to control the rate of flow of fluid under pressure between the interior of said larger counterbore and said lower of said two other passageways and the smaller of which is so disposed as to control the rate of flow of fluid under pressure from the upper to the lower of said passageways in bypass of said larger choke, (f) movable abutment means subject respectively to pressure in the brake pipe and in said another chamber, the deflection of said abutment means a first chosen degree in one direction responsive to a reduction of the pressure in the brake pipe at a service rate being effective to cause said abutment means to effect unseating of said one annular member carried by said double seated valve from said annular valve seat at said one end of said one bore against the yielding resistance of said lighter spring, without effecting seating of the other of said pair of annular members carried by said double seated valve on said annular valve seat on said one side of said annular piston, to cause the release of fluid under pressure from said another chamber to atmosphere via said one bore, said smaller counterbore, said annular piston, said larger counterbore, said larger choke and said lower one of said two other passageways at a rate determined by the diameter of said larger choke, and the deflection of said abutment means a second chosen degree, which is greater than said first chosen degree, in said one direction responsive to a reduction of the pressure in the brake pipe at an emergency rate being effective to cause said abutment means to effect seating of said other of said pair of annular members carried by said double seated valve on said annular valve seat on said one side of said annular piston and thereafter shifting of said piston against the yielding resistance of said stronger spring, to a position in abutting relationship with said casing, in which position said pair of seals carried by said piston form seals with the wall surface of said larger counterbore below said one end of the upper one of said two other passageways, to cause the release of fluid under pressure from said other chamber to atmosphere via said one bore, said smaller and larger counterbores, the upper one of said two other passageways, said smaller choke, and said lower one of said two other passageways at a rate determined by the diameter of said smaller choke, and (g) resilient means effective to yieldingly resist deflection of said abutment means in a direction opposite said one direction is response to the pressure in the brake pipe exceeding that in said another chamber, said resilient means being effective to subsequently deflect said abutment means in said one direction responsive to the pressure in said another chamber increasing to that in said brake pipe.

2. A fluid-pressure-operated emergency valve device, as recited in claim 1, further characterized in that each of said poppet-type valves, other than said double seated poppet-type valve, comprises a resilient annular valve member disposed in surrounding relation to the fluted stem thereof for engagement with the corresponding annular valve seat, each resilient annular valve member being identical and interchangeable with each of the other resilient annular valve members.

3. A fluid-pressure-operated emergency valve device, as recited in claim 1, further characterized in that said movable abutment means comprises a pair of spaced-apart movable abutments between which said plurality of poppet-type valves are disposed, the fluted stem of certain of said poppet-type valves being engaged by one of said abutments to effect unseating of said certain poppet-type valves upon deflection of said abutments in said one direction, and the fluted stem of another of said poppet-type valves being engaged by the other one of said abutments to effect unseating thereof upon deflection of said abutments in said opposite direction.

4. A fluid-pressure-operated emergency valve device, as recited in claim 1, further characterized in that said movable abutment means comprises a pair of spaced-apart and interconnected movable abutments between which said plurality of poppet-type valves are so disposed that the fluted stem of said double seated poppet-type valve is engaged by one of said abutments to effect unseating of said double seated poppet-type valve to cause the release of fluid under pressure from said another chamber to atmosphere in response to a first chosen degree of deflection of said abutments in said one direction, that the fluted stem of two other of said poppet-type valves is engaged by said one of said abutments to effect unseating thereof to cause, respectively, release of fluid under pressure from the brake pipe to atmosphere at an emergency rate, and the supply of fluid under pressure from the emergency reservoir to the brake cylinder in response to a degree of deflection of said abutments that is in excess of said first chosen degree, and that the fluted stem of a fourth one of said poppet-type valves in engaged by the other of said pair of abutments to effect unseating thereof to cause flow of fluid under pressure from the brake cylinder and the auxiliary reservoir to the brake pipe in response to a chosen degree of deflection of said abutments in said opposite direction.

5. A fluid-pressure-operated emergency valve device, as recited in claim 1, further characterized by an inshot valve mechanism for providing a two-stage buildup of pressure in the brake cylinder.

6. A fluid-pressure-operated emergency valve device, as recited in claim 1, further comprising:
   (a) a normally closed valve past which fluid under pressure may flow to the brake cylinder,
   (b) fluid-pressure-operated means for maintaining said valve closed,
   (c) means for supplying the fluid under pressure vented from said another chamber to said fluid-pressure-operated means, and
   (d) choke means arranged in parallel with said normally closed valve through which fluid under pressure flows to the brake cylinder at a restricted rate while said valve is maintained closed by said fluid-pressure-operated means.

7. A fluid-pressure-operated emergency valve device, as recited in claim 1, further characterized in that said pair of spaced-apart seals carried by said annular piston, while said piston abuts said casing, forms seals with the wall surface of said larger coaxial counterbore at locations that are respectively above and below the location at which said one end of said lower one of said two other passageways opens at the wall surface of said larger coaxial counterbore to prevent flow of fluid under pressure from said another chamber to atmosphere via the larger of said pair of chokes.

8. A fluid-pressure-operated emergency valve device, as recited in claim 1, further characterized by means carried by said casing enabling the removal of said anular piston, said pair of springs and said double seated poppet-type valve from said coaxial counterbores independently of the remainder of said plurality of poppet-type valves.

9. A fluid-pressure-operated emergency valve device, as recited in claim 1, further characterized in that the diameter of said larger choke is such as to provide for the flow of fluid under pressure therethrough at a rate that is substantially equal to said service rate whereby fluid under pressure is released from said another chamber to atmosphere at said service rate so long as fluid under pressure is released from the brake pipe at a service rate to prevent said abutment means from effecting seating of said other of said pair of annular members carried by said double seated valve on said annular valve seat on said one side of said annular piston.

10. A fluid-pressure-operated emergency valve device, as recited in claim 3, further characterized by a valve stem to the respective opposite ends of which said pair of movable abutments are operatively connected, said stem being effective to cause operation of one of said poppet-type valves upon deflection of said movable abutments in said one direction to cause release of fluid under pressure from the brake pipe to atmosphere at an emergency rate.

* * * * *